US009831520B2

(12) United States Patent
Kwon et al.

(10) Patent No.: US 9,831,520 B2
(45) Date of Patent: *Nov. 28, 2017

(54) ELECTRODE ASSEMBLY AND LITHIUM SECONDARY BATTERY COMPRISING THE SAME

(71) Applicant: LG CHEM, LTD., Seoul (KR)

(72) Inventors: Sungjin Kwon, Daejeon (KR); Soonho Ahn, Seoul (KR); Ki Woong Kim, Daejeon (KR); Young Hun Kim, Daejeon (KR); Won Hyun Jeon, Seoul (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,607

(22) Filed: Oct. 9, 2014

(65) Prior Publication Data

US 2015/0024245 A1 Jan. 22, 2015

Related U.S. Application Data

(63) Continuation of application No. PCT/KR2013/003985, filed on May 7, 2013.

(30) Foreign Application Priority Data

May 7, 2012 (KR) ........................ 10-2012-0047822

(51) Int. Cl.
*H01M 10/04* (2006.01)
*H01M 4/13* (2010.01)
*H01M 10/052* (2010.01)
*H01M 10/0585* (2010.01)
*H01M 10/42* (2006.01)
*H01M 10/0583* (2010.01)
*H01M 10/0525* (2010.01)

(52) U.S. Cl.
CPC ......... *H01M 10/0459* (2013.01); *H01M 4/13* (2013.01); *H01M 10/052* (2013.01); *H01M 10/0583* (2013.01); *H01M 10/0585* (2013.01); *H01M 10/4235* (2013.01); *H01M 10/0525* (2013.01); *H01M 2220/20* (2013.01); *Y02E 60/122* (2013.01); *Y02T 10/7011* (2013.01)

(58) Field of Classification Search
CPC ........... H01M 10/0459; H01M 10/052; H01M 10/0525; H01M 10/0585; H01M 10/4235; H01M 2220/20; H01M 4/13
See application file for complete search history.

(56) References Cited

U.S. PATENT DOCUMENTS

| | | | | |
|---|---|---|---|---|
| 6,461,762 B1 * | 10/2002 | Yang et al. | | 429/127 |
| 8,741,477 B2 | 6/2014 | Obika | | |
| 2002/0041996 A1 * | 4/2002 | Morioka | | H01M 10/0436 429/213 |
| 2002/0160257 A1 * | 10/2002 | Lee | | H01M 6/46 429/130 |
| 2002/0160258 A1 * | 10/2002 | Lee | | H01M 2/1686 429/130 |
| 2002/0187404 A1 * | 12/2002 | Roh | | H01M 10/0567 429/325 |
| 2003/0013012 A1 | 1/2003 | Ahn et al. | | |
| 2003/0054256 A1 | 3/2003 | Takahashi et al. | | |
| 2003/0104273 A1 | 6/2003 | Lee et al. | | |
| 2003/0194605 A1 | 10/2003 | Fauteux et al. | | |
| 2004/0038126 A1 * | 2/2004 | Gu | | H01M 2/021 429/162 |
| 2005/0069773 A1 * | 3/2005 | Nakai | | H01M 10/0525 429/231.1 |
| 2007/0120526 A1 | 5/2007 | Kumeuchi et al. | | |
| 2008/0280208 A1 | 11/2008 | Naoi et al. | | |
| 2010/0261047 A1 | 10/2010 | Kim et al. | | |
| 2010/0279161 A1 | 11/2010 | Kang et al. | | |
| 2011/0045335 A1 | 2/2011 | Lee et al. | | |
| 2011/0104550 A1 | 5/2011 | Ahn et al. | | |
| 2011/0135996 A1 * | 6/2011 | Ahn et al. | | 429/162 |
| 2011/0281160 A1 | 11/2011 | Doi | | |
| 2012/0045685 A1 | 2/2012 | Seki et al. | | |
| 2013/0089768 A1 * | 4/2013 | Soong et al. | | 429/120 |
| 2013/0122333 A1 | 5/2013 | Obika et al. | | |
| 2013/0209848 A1 | 8/2013 | Min et al. | | |
| 2013/0266841 A1 | 10/2013 | Ryu et al. | | |
| 2013/0295436 A1 * | 11/2013 | Kwon et al. | | 429/159 |
| 2014/0186685 A1 * | 7/2014 | Kwon et al. | | 429/160 |

FOREIGN PATENT DOCUMENTS

| | | |
|---|---|---|
| CN | 1457517 A | 11/2003 |
| JP | 2000-228219 A | 8/2000 |
| JP | 2003-109666 A | 4/2003 |
| JP | 2003-523060 A | 7/2003 |
| JP | 2007-173223 A | 7/2007 |
| JP | 2007-317638 A | 12/2007 |
| JP | 2009-152135 A | 7/2009 |
| JP | 2009-530766 A | 8/2009 |
| JP | 2010-20921 A | 1/2010 |
| JP | 2010-40489 A | 2/2010 |
| JP | 2010-113819 A | 5/2010 |
| JP | 2010-525542 A | 7/2010 |
| JP | 2010-532545 A | 10/2010 |
| JP | 2011-9039 A | 1/2011 |
| JP | 2011-100623 A | 5/2011 |
| JP | 2011-222388 A | 11/2011 |
| JP | 2012-523087 A | 9/2012 |
| KR | 10-2008-0005631 A | 1/2008 |
| KR | 10-2009-0003823 A | 1/2009 |

(Continued)

OTHER PUBLICATIONS

International Search Report for PCT/KR2013/003985 dated Aug. 21, 2013.

(Continued)

*Primary Examiner* — Anca Eoff
(74) *Attorney, Agent, or Firm* — Birch, Stewart, Kolasch & Birch, LLP

(57) ABSTRACT

Disclosed herein is an electrode assembly including 2n (n being a natural number equal to or greater than 1) polar bodies which are stacked.

9 Claims, 7 Drawing Sheets

(56) References Cited

FOREIGN PATENT DOCUMENTS

| | | | |
|---|---|---|---|
| KR | 10-2010-0109873 A | | 10/2010 |
| KR | 10-2012-0007458 A | | 1/2012 |
| WO | WO 2007/142428 | * | 12/2007 |
| WO | WO 2010/089855 A1 | | 8/2010 |
| WO | WO 2011/125325 A1 | | 10/2011 |
| WO | WO 2012/014730 A1 | | 2/2012 |

* cited by examiner

[FIG. 1]
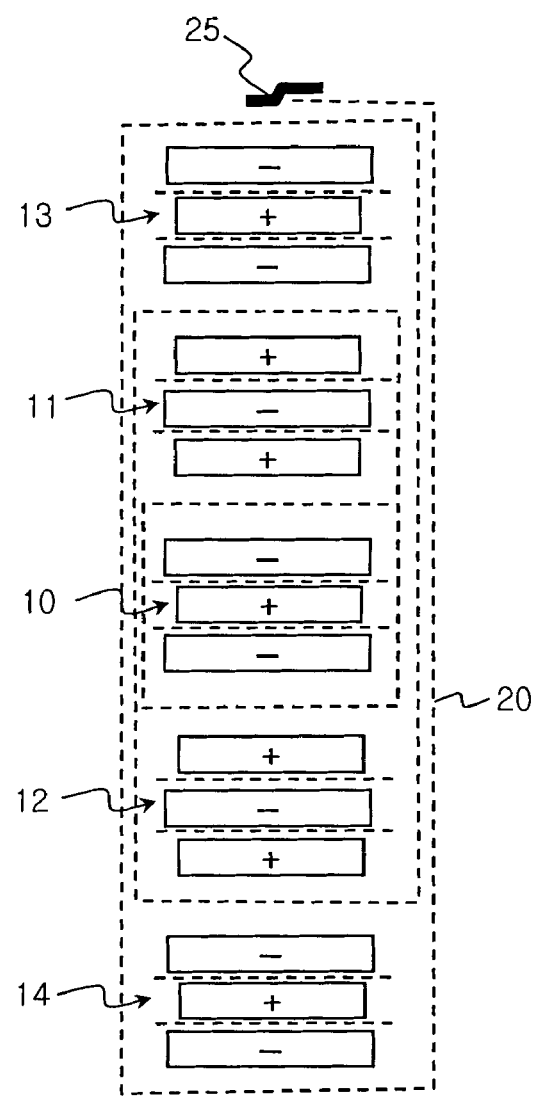

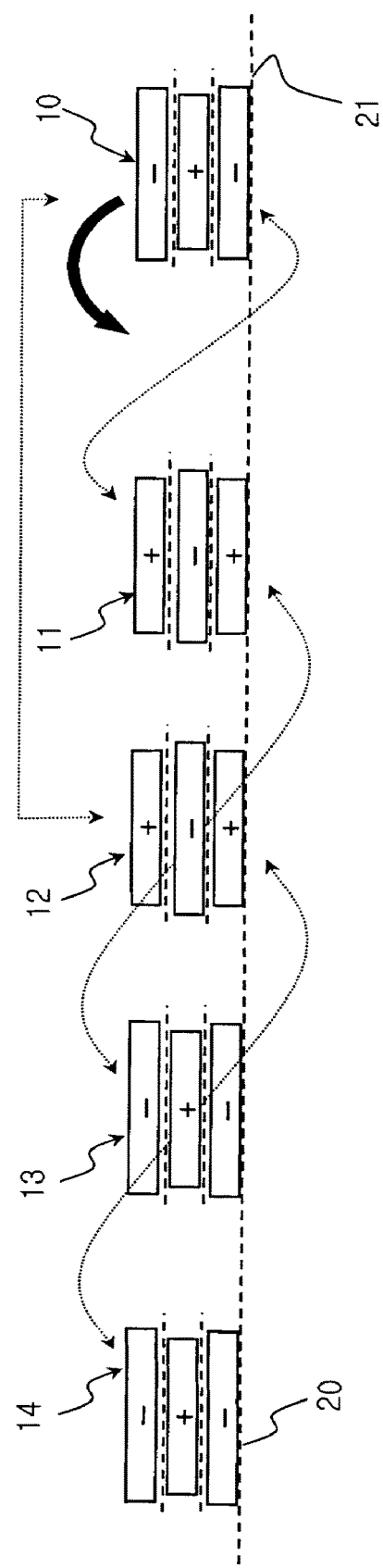
[FIG. 2]

[FIG. 3]
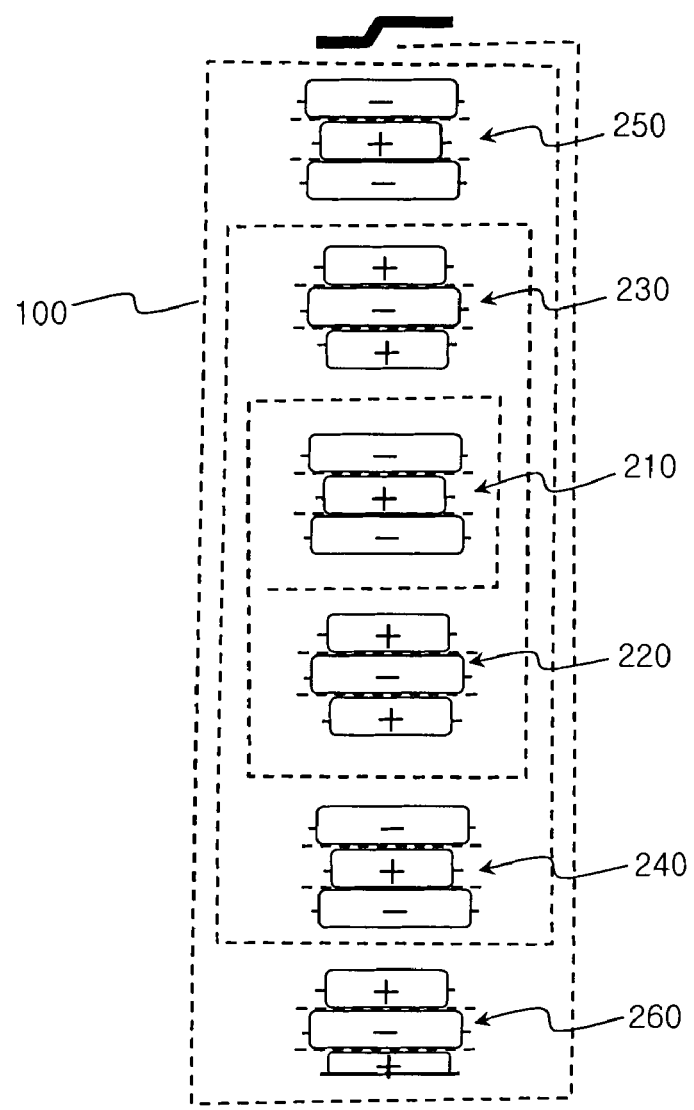

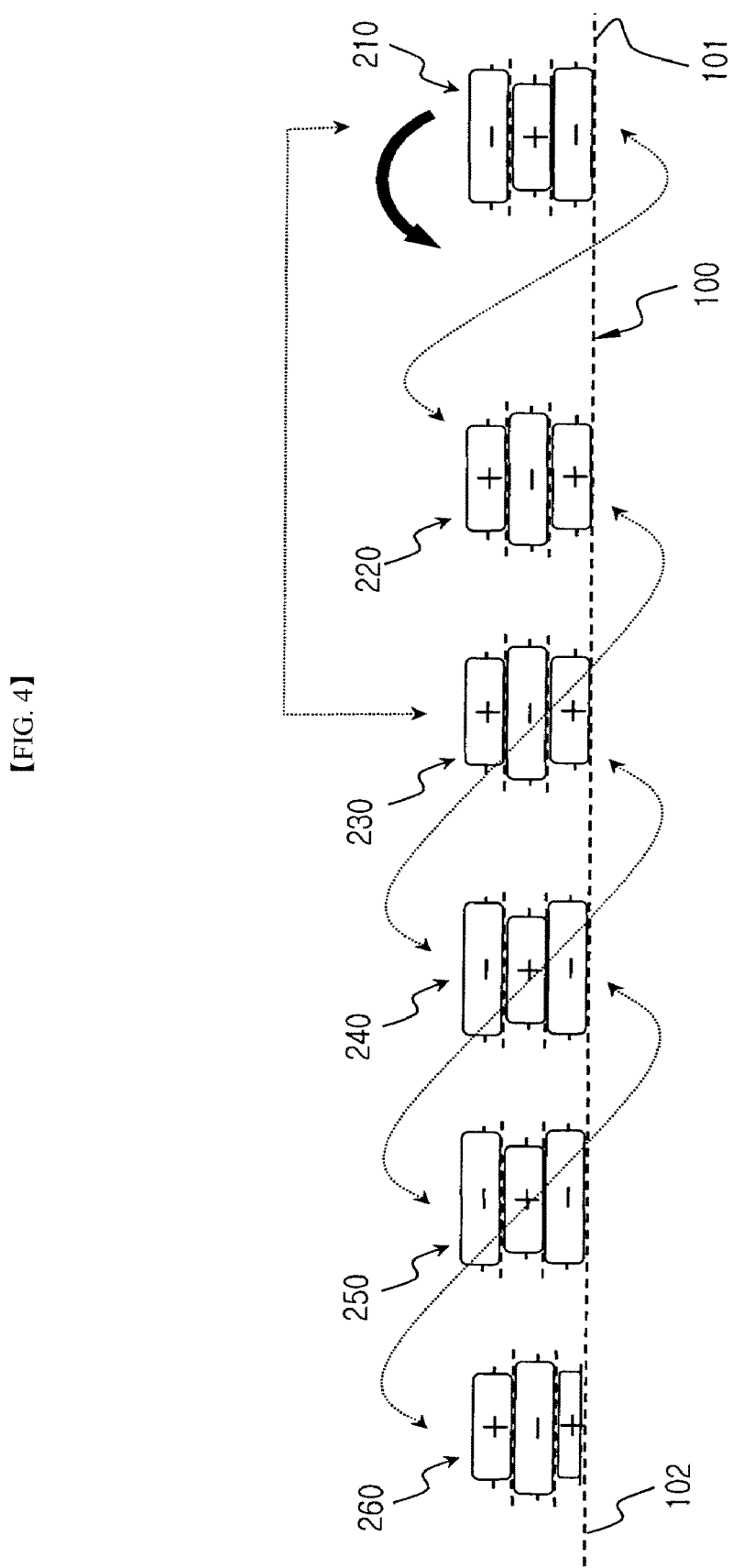
[FIG. 4]

[FIG. 5]
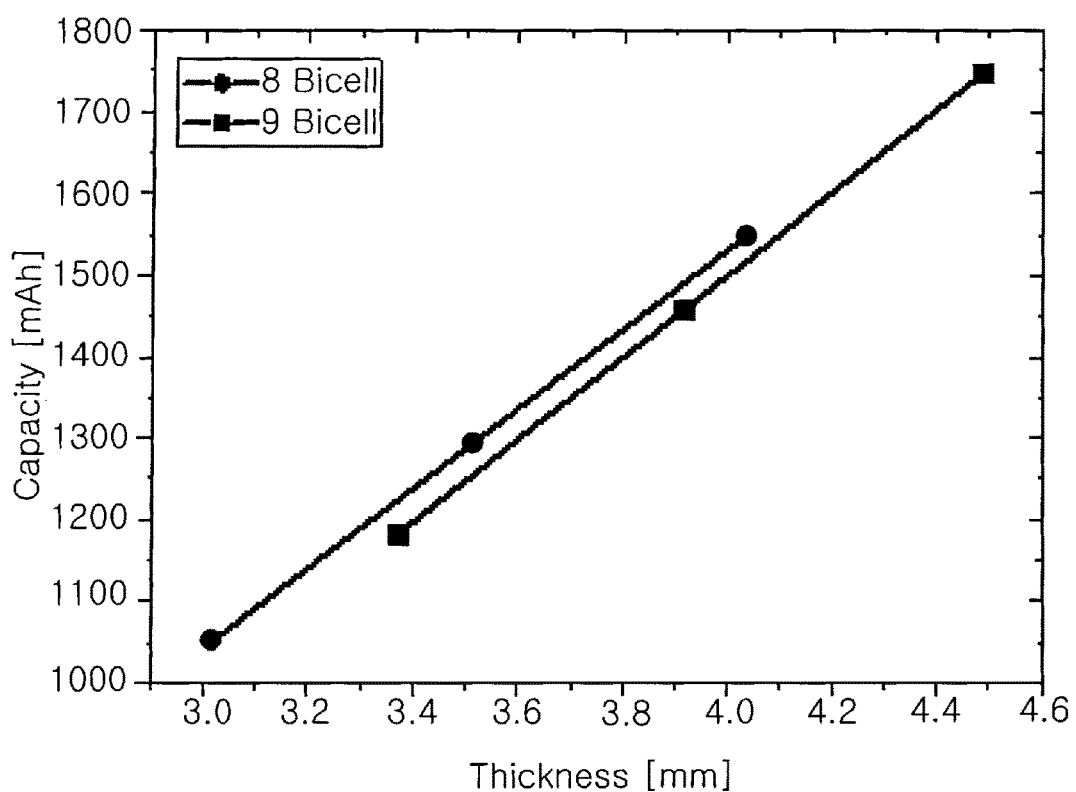

[FIG. 6]
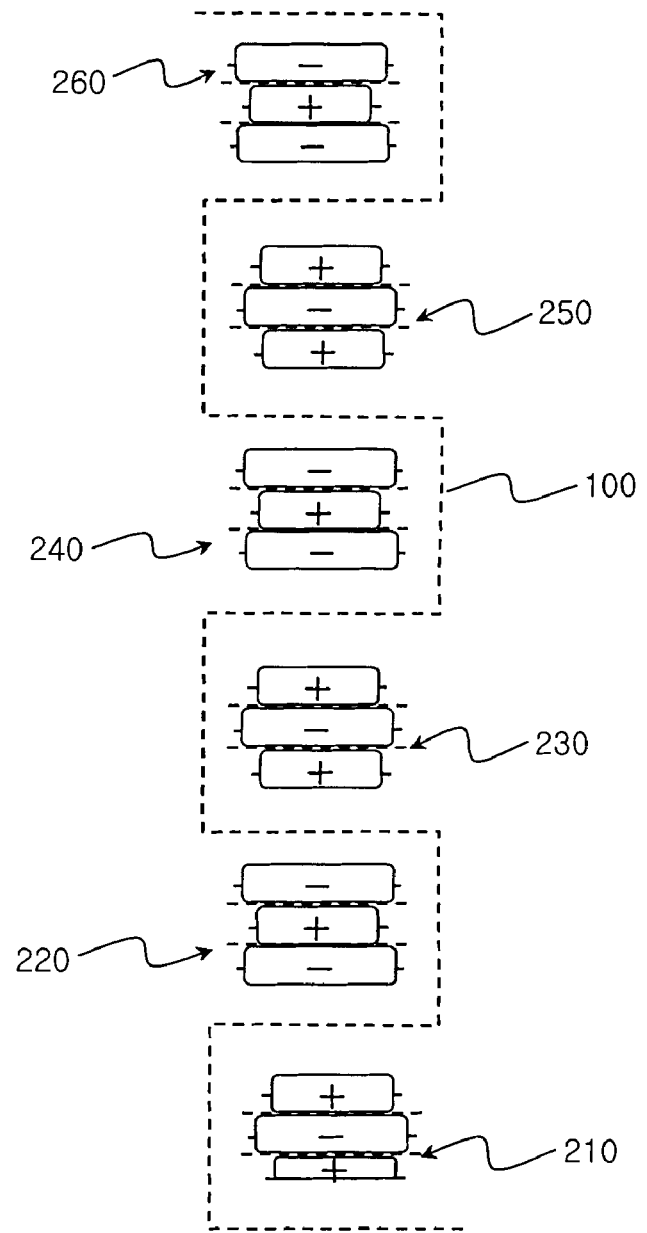

[FIG. 7]
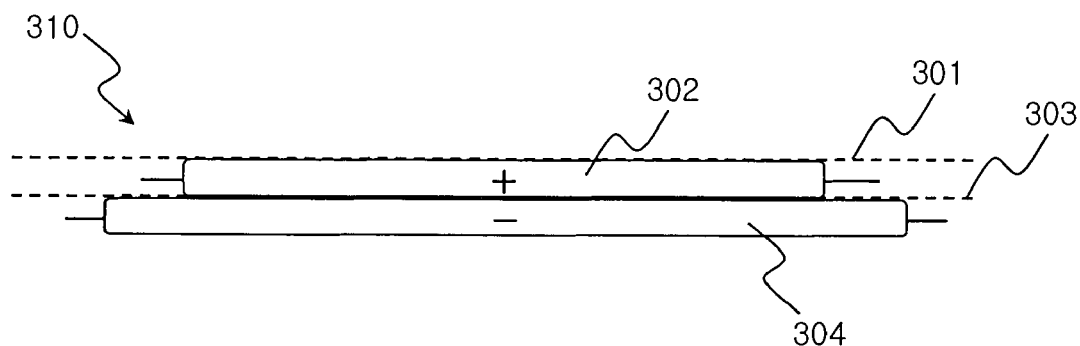
[FIG. 8]
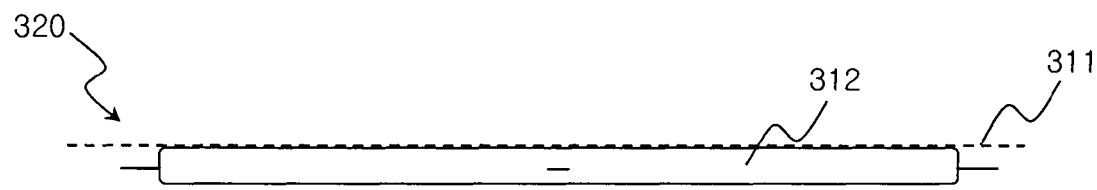
[FIG. 9]
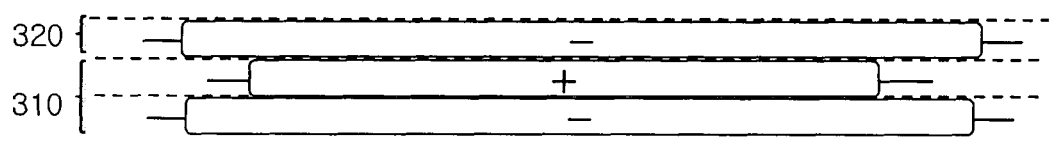

ELECTRODE ASSEMBLY AND LITHIUM SECONDARY BATTERY COMPRISING THE SAME

CROSS REFERENCE TO RELATED APPLICATIONS

This application is a Continuation of PCT International Application No. PCT/KR2013/003985, filed on May 7, 2013, which claims priority under 35 U.S.C. 119(a) to Patent Application No. 10-2012-0047822, filed in Republic of Korea on May 7, 2012, all of which are hereby expressly incorporated by reference into the present application.

TECHNICAL FIELD

The present invention relates to a lithium secondary battery that can be repeatedly charged and discharged and an electrode assembly constituting the same.

BACKGROUND ART

As the price of energy sources has increased due to exhaustion of fossil fuel and concern about environmental pollution has been amplified, the demand for environmentally friendly alternative energy sources has increased as an essential factor for future life. In particular, a recent trend for multiple functions, high performance, and miniaturization of mobile devices has increased the demand for a secondary battery having high capacity while having a small size.

In terms of the shape of batteries, the demand for prismatic secondary batteries or pouch-shaped secondary batteries, which are thin enough to be applied to products, such as mobile phones, is very high. In terms of the material for batteries, the demand for lithium secondary batteries, such as lithium ion batteries and lithium ion polymer batteries, having high energy density, discharge voltage, and output stability, is very high.

DISCLOSURE

Technical Problem

It is an object of the present invention to provide an electrode assembly having a high capacity to thickness ratio and a lithium secondary battery including the same.

Technical Solution

In accordance with one aspect of the present invention, the above and other objects can be accomplished by the provision of an electrode assembly including 2n (n being a natural number equal to or greater than 1) polar bodies which are stacked.

The polar bodies may be one or more polar bodies selected from a group consisting of (i) a cathode, (ii) an anode, (iii) a first electrode element including a cathode, an anode, and a first separator, the first electrode element being configured to have a stacked structure in which the cathode and the anode are stacked in a state in which the first separator is separably disposed between the cathode and the anode, (iv) a second electrode element including a cathode, an anode, and a first separator, the second electrode element being configured to have a stacked structure in which the cathode and the anode are stacked in a state in which the first separator is disposed between the cathode and the anode, the cathode, the anode, and the first separator being attached to one another, and (v) a third electrode element including any one selected from between a cathode and an anode and a first separator, any one selected from between the cathode and the anode and the first separator being attached to each other.

Specifically, the first electrode element may include outermost electrodes having different polarities or the same polarity. In the same manner, the second electrode element may include outermost electrodes having different polarities or the same polarity.

The second electrode element may be configured to have a structure in which at least one of the outermost electrodes is disposed between first separators. That is, the second electrode element may be configured to have a structure in which one of the outermost electrodes is disposed between the first separators or a structure in which both of the outermost electrodes are disposed between the first separators.

In addition, the third electrode element may be configured to have a structure in which any one selected from between the cathode and the anode is disposed between the first separators.

Meanwhile, a second separator may be disposed between the polar bodies. The second separator may include a separation sheet disposed between the polar bodies to cover sides of the polar bodies at which electrode terminals of the polar bodies are not formed.

On the other hand, at least one selected from between the outermost electrodes may be a single-side coated electrode having an electrode mixture layer formed only at one side of which faces an electrode having an opposite polarity via the first separator.

The electrode assembly according to the present invention may have a stacked structure of any one selected from among the polar bodies defined in (i) to (v) as described above or a stacked structure of two or more polar bodies selected from among the polar bodies defined in (i) to (v) as described above.

For example, 2n−1 first electrode elements and any one selected from among the cathode, the anode, and third electrode element may be stacked.

In addition, 2n−1 second electrode elements and any one selected from among the cathode, the anode, and third electrode element may be stacked.

In accordance with other aspects of the present invention, there are provided a lithium secondary battery including the electrode assembly with the above-stated construction provided in a battery case together with an electrolyte and a battery module and battery pack including the lithium secondary battery as a unit cell.

The battery case may be a metal can or a pouch-shaped battery case made of a laminate sheet comprising a metal layer and a resin layer.

The lithium secondary battery may be a lithium ion polymer battery, a lithium ion battery, or a lithium polymer battery.

The battery module is configured by connecting a plurality of unit cells in series or in series and parallel. The battery module is well known in the art to which the present invention pertains and, therefore, a detailed description thereof will be omitted.

In addition, the battery pack including the battery module may be used as a power source of an electric vehicle, a hybrid electric vehicle, a plug-in hybrid electric vehicle, or a power storage device.

The structure and manufacturing method of a lithium secondary battery and a middle or large-sized battery module and battery pack including the lithium secondary battery as a unit cell are well known in the art to which the present invention pertains and, therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a typical view showing an exemplary structure of a conventional stacked and folded type electrode assembly;

FIG. 2 is a typical view exemplarily showing an arrangement combination of polar bodies in a process of manufacturing the stacked and folded type electrode assembly of FIG. 1;

FIG. 3 is a typical view showing an electrode assembly according to an embodiment of the present invention;

FIG. 4 is a typical view exemplarily showing an arrangement combination of polar bodies in a process of manufacturing the electrode assembly of FIG. 3;

FIG. 5 is a graph showing a comparison between a capacity to thickness ratio of the conventional stacked and folded type electrode assembly and a capacity to thickness ratio of the electrode assembly according to the embodiment of the present invention;

FIG. 6 is a typical view showing an electrode assembly according to another embodiment of the present invention;

FIG. 7 is a typical view showing a second electrode element according to an embodiment of the present invention;

FIG. 8 is a typical view showing a third electrode element according to an embodiment of the present invention; and FIG. 9 is a view typically showing a structure in which the electrode elements of FIGS. 7 and 8 are stacked.

BEST MODE

Now, exemplary embodiments of the present invention will be described in detail with reference to the accompanying drawings. It should be noted, however, that the scope of the present invention is not limited by the illustrated embodiments.

In general, a conventional stacked and folded type electrode assembly includes an odd number of bicells. Each bicell is a polar body configured to have a structure in which the uppermost electrode and the lowermost electrode have the same polarity. Each bicell may be a first electrode element or a second electrode element.

FIGS. 1 and 2 typically show an exemplary structure and a manufacturing process of a conventional stacked and folded type electrode assembly.

Referring to these drawings, five bicells 10, 11, 12, 13, and 14, each of which is configured to have a structure in which electrodes, formed by coating opposite sides of a current collector with an electrode mixture, and separators are alternately stacked in a state in which the separators are disposed between the respective electrodes and the uppermost electrode and the lowermost electrode have the same polarity, are stacked in a state in which a separation sheet 20 is disposed between the respective bicells such that cathodes and anodes face each other. The separation sheet 20 is disposed between the respective the bicells. The separation sheet 20 continuously covers sides of the respective bicells in a state in which the separation sheet 20 is disposed between the respective the bicells.

The outer end of the separation sheet 20 is fixed by an adhesive tape 25.

The stacked and folded type electrode assembly may be manufactured, for example, by arranging the bicells 10, 11, 12, 13, and 14 on the separation sheet 20, which has a predetermined length, at predetermined intervals and sequentially winding the separation sheet 20 from one end 21 thereof.

At this time, the bicells 10, 11, 12, 13, and 14 are arranged as follows. The first bicell 10 and the second bicell 11 are spaced apart from each other by the width of at least one bicell such that the first bicell 10 and the second bicell 11 are stacked during winding of the separation sheet 20. During winding of the separation sheet 20, therefore, a lower end electrode (anode) of the first bicell 10 faces an upper end electrode (cathode) of the second bicell 11 in a state in which the separation sheet 20 is disposed between the lower end electrode (anode) of the first bicell 10 and the upper end electrode (cathode) of the second bicell 11 after the outside of the first bicell 10 is completely covered by the separation sheet 20.

It is necessary to increase the covering length of the separation sheet 20 such that the other bicells 12, 13, and 14 are sequentially stacked due to winding of the separation sheet 20. To this end, the bicells 12, 13, and 14 are arranged such that the distances among the bicells 12, 13, and 14 are sequentially increased in the winding direction of the separation sheet 20.

In addition, it is necessary to configure the bicells 10, 11, 12, 13, and 14 such that cathodes and anodes face each other at the interfaces between the stacked bicells during winding of the separation sheet 20. To this end, the first bicell 10 is an A type bicell configured to have a structure including an anode, a separator, a cathode, a separator, and an anode, the second bicell 11 and the third bicell 12 each are a C type bicell configured to have a structure including a cathode, a separator, an anode, a separator, and a cathode, and the fourth bicell 13 and the fifth bicell 14 each are an A type bicell configured to have a structure including an anode, a separator, a cathode, a separator, and an anode.

The capacity of a battery is directly proportional to a loading level. Consequently, the increase of the loading level accompanies the increase of the capacity of the battery. As the loading level is increased, however, the rate capability of the battery is lowered.

For this reason, it is necessary to design the loading level in consideration of the rate capability of the battery.

Due to limitations of the loading level, the capacity of the conventional stacked and folded type electrode assembly is increased by increasing the number of bicells having reduced loading levels. That is, it is possible to increase the capacity of a stacked and folded type electrode assembly including 2n−1 bicells A by increasing the number of bicells B each having a lower loading level than each of the bicells A due to limitations of the loading level.

As a result, a stacked and folded type electrode assembly including 2n+1 bicells B is manufactured. In this case, however, a capacity to thickness ratio is reduced at a section of the stacked and folded type electrode assembly at which the number of bicells is increased from 2n−1 to 2n+1.

According to an unlimited embodiment of the present invention, a stacked and folded type electrode assembly including 2n bicells has a higher capacity to thickness ratio than the conventional stacked and folded type electrode assembly including 2n+1 bicells.

The electrode assembly according to the unlimited embodiment of the present invention may be configured to have a structure in which 2n bicells, each of which is configured to have a structure in which electrodes, formed by coating a current collector with an electrode mixture, and separators are stacked in a state in which the separators are disposed between the respective electrodes and the uppermost electrode and the lowermost electrode have the same polarity, are stacked. A separation sheet is disposed between the respective the bicells. The separation sheet continuously covers sides of the respective bicells at which electrode terminals of the bicells are not formed. Any one selected from between the uppermost bicell and the lowermost bicell may include a single-side coated electrode, formed by coating only one side of the current collector with the electrode mixture, as the outermost electrode.

The electrode may be a cathode or an anode. The cathode may be configured to have a structure in which opposite sides of a cathode current collector are coated with a cathode material or a structure in which only one side of a cathode current collector are coated with a cathode material. The anode may be configured to have a structure in which opposite sides of an anode current collector are coated with an anode material. Consequently, any one selected from between the uppermost bicell and the lowermost bicell may be a C type bicell configured to have a structure in which the polarity of the outermost electrode is positive.

The bicell may be a first electrode element configured to have a structure in which a cathode, an anode, and a separator are simply stacked or a second electrode element configured to have a structure in which a cathode, an anode, and a separator are simply stacked and then laminated. In addition, the bicell may be configured to have a structure in which second electrode elements, each of which is configured to have a structure in which a cathode, an anode, and a separator are simply stacked and then laminated, are stacked, a structure in which a second electrode element, which is configured to have a structure in which a cathode, an anode, and a separator are simply stacked and then laminated, and a cathode or an anode are simply stacked, or a structure in which a second electrode element, which is configured to have a structure in which a cathode, an anode, and a separator are simply stacked and then laminated, and a cathode or an anode are simply stacked and then laminated.

In a case in which the second electrode element is included, it is possible to improve mass productivity or yield percent as compared with the first electrode element, which is configured to have a structure in which the cathode, the anode, and the separator are simply stacked. In addition, it is possible to minimize volume expansion of the battery due to swelling, thereby improving safety of the battery.

Specifically, the bicell may be an A type bicell configured to have a structure in which a cathode, separators, and anodes are stacked or stacked and then laminated such that the anodes are located at the outermost sides of the bicell or a C type bicell configured to have a structure in which cathodes, separators, and an anode are stacked or stacked and then laminated such that the cathodes are located at the outermost sides of the bicell.

The bicell may be a combination of a second electrode element configured to have a structure in which a cathode, a separator, and an anode are stacked and then laminated such that the separator is disposed between the cathode and the anode and the cathode and the anode are located at the lowermost sides thereof and a third electrode element configured to have a structure in which any one selected from between a cathode and an anode and a separator are stacked and laminated, a combination of a second electrode element configured to have a structure in which a cathode, an anode, and a separator are stacked and then laminated such that any one selected from between the cathode and the anode and the separator are located at the lowermost sides thereof and a cathode or an anode, or a combination of a second electrode element configured to have a structure in which a cathode, separators, and an anode are stacked and then laminated such that the separators are located at the lowermost sides thereof, another second electrode element configured to have a structure in which a cathode, a separator, and an anode are stacked and then laminated such that the separator is disposed between the cathode and the anode, and a cathode or an anode.

The large-area one of the electrodes facing each other in a state in which the separator or the separation sheet is disposed between the electrodes may be configured as an anode. In this case, it is possible to maximally restrain dendritic growth of lithium metal at the anode during charge and discharge of the battery.

The separation sheet may have a sufficient length to cover sides of the respective bicells at which electrode terminals of the bicells are not formed in a state in which the separation sheet is disposed between the respective bicells.

In a case in which interface contact between the electrode and the separator or between the electrode and the separation sheet is not retained due to repetitive charge and discharge of the battery, the capacity and performance of the lithium secondary battery are abruptly reduced. For this reason, it is necessary to provided pressure that is capable of stably pressing the interface between the electrode and the separator or between the electrode and the separation sheet such that the interface contact between the electrode and the separator or between the electrode and the separation sheet is continuously retained.

In the stacked and folded type electrode assembly, tensile force generated during winding or bending of the separation sheet can press the interface between the electrode and the separator or between the electrode and the separation sheet. Consequently, the stacked and folded type electrode assembly is very excellent in terms of battery performance and capacity.

In an unlimited example, the separation sheet may have a length extending to cover the electrode assembly once after winding of the separation sheet.

The outer end of the separation sheet may be fixed by thermal bonding or a tape.

For example, a thermal welding machine or a hot plate may contact the outer end of the separation sheet after winding of the separation sheet such that the outer end of the separation sheet is melted by heat from the thermal welding machine or the hot plate and fixedly adheres to the other portion of the separation sheet. As a result, pressure is continuously retained, thereby achieving stable interface contact between the electrode and the separation sheet.

The separator used in the stacked and folded type electrode assembly preferably has an adhesive function based on thermal bonding so as to configure bicells. On the other hand, it is not necessary for the separation sheet to have such an adhesive function. However, the separation sheet preferably has such an adhesive function so as to easily perform a winding or bending process. In a preferred example, the separator and/or the separation sheet may be made of a polymer film for a polymer electrolyte, having an adhesive function by thermal bonding, which includes a first polymer layer of micro porosity and a second polymer layer obtained by gelling polyvinylidene fluoride chlorotrifluoroethylene copolymer, disclosed in Korean Patent Application No.

1999-57312 filed in the name of the applicant of the present application. The disclosure of the application is incorporated herein by reference.

When an external object, such as a needle-shaped body, presses or penetrates the lithium secondary battery, the cathode and the anode of the lithium secondary battery contact each other with the result that a short circuit occurs. At this time, the temperature of the lithium secondary battery abruptly increases due to reaction of electrode active materials. Eventually, the lithium secondary battery may catch a fire or explode. That is, the safety of the lithium secondary battery is low.

Particularly, in a case in which the stacked and folded type electrode assembly is mounted in a battery case made of a laminate sheet, the mechanical strength of which is relatively low, and the outer edge of the battery case is thermally bonded to manufacture a pouch-shaped secondary battery having a sealed portion, the pouch-shaped secondary battery may be easily deformed due to external impact or an external object, such as a needle-shaped body, may easily penetrate the pouch-shaped secondary battery.

That is, when an external object, such as a needle-shaped body, presses or penetrates the pouch-shaped secondary battery, the cathode and the anode of the pouch-shaped secondary battery contact each other with the result that a short circuit occurs. At this time, the temperature of the pouch-shaped secondary battery abruptly increases due to reaction of electrode active materials. In addition, a cathode active material made of a lithium transition metal oxide exhibiting low electric conductivity generates a large amount of heat due to high resistance of the cathode active material when a short circuit occurs in the pouch-shaped secondary battery. As a result, combustion or explosion of the pouch-shaped secondary battery is accelerated.

In the stacked and folded type electrode assembly according to the unlimited embodiment of the present invention, however, the outermost bicells function as safety members to prevent penetration of the needle-shaped body such that a minute short circuit occurs primarily in the battery, thereby preventing combustion or explosion of the battery.

The function of the outermost bicells as the safety member is very important to a middle or large-sized battery module and battery pack configured to have a structure in which combustion or explosion of one lithium secondary battery may lead to combustion or explosion of the entirety of the middle or large-sized battery module and battery pack.

More preferably, the bicells may include electrodes configured to have rounded corners so as to prevent the occurrence of a short circuit in the battery due to deformation in shape of the battery when the battery falls in a state in which a corner of the battery is directed downward.

FIGS. 3 and 4 typically show a structure and a manufacturing process of an electrode assembly according to an unlimited embodiment of the present invention. Five bicells 210, 220, 230, 240, and 250 have the same structures as those of the conventional stacked and folded type electrode assembly shown in FIG. 1.

Unlike the conventional stacked and folded type electrode assembly, however, the electrode assembly according to the embodiment of the present invention further includes an outermost bicell 260 located at the third place from an A type bicell 210 located at the middle portion of the electrode assembly in a vertical direction with the result that the electrode assembly according to the embodiment of the present invention includes a total of 2n bicells.

The bicell 260 is configured to have a structure in which a first cathode, a separator, an anode, a separator, and a second cathode are stacked. The first cathode and the anode each is formed by coating opposite sides of a current collector with an electrode mixture. On the other hand, the second cathode is formed by coating only one side of a current collector with a cathode mixture. Specifically, one side of a current collector facing the A type bicell 210 located at the middle portion of the electrode assembly is coated with a cathode mixture and the other side of the current collector facing the separation sheet is not coated with a cathode mixture.

When a needle-shaped body (not shown) penetrates the electrode assembly, therefore, the metal sheets of the outermost bicell 260, the amount of heat generated from which due to a short circuit is relatively small, come into contact with each other and short-circuited in the first place, thereby preventing combustion or explosion of the battery.

The electrode assembly according to the embodiment of the present invention may be manufactured using the method of manufacturing the conventional stacked and folded type electrode assembly. For example, the electrode assembly according to the embodiment of the present invention may be manufactured by arranging the bicells 210, 220, 230, 240, and 250 on a long separation sheet 100 at predetermined intervals and sequentially winding the separation sheet 100 from one end 101 thereof. The outer end of the separation sheet 100 may be fixed by an adhesive tape.

FIG. 6 is a typical view showing an electrode assembly according to another embodiment of the present invention. Referring to FIG. 6, the electrode assembly includes an even number of bicells 210, 220, 230, 240, 250, and 260 in the same manner as in the electrode assembly of FIG. 3 except that a separation sheet 100 is folded or bent in the shape of Z. The bicell 210, which is one of the outermost bicells 210 and 260, is a C type bicell. The C type bicell 210 includes a single-side coated electrode formed by coating only one side of a cathode current collector with a cathode mixture.

FIGS. 7 to 9 typically show a second electrode element and a third electrode element according to unlimited embodiments of the present invention and a structure in which the electrode elements are stacked, respectively.

Referring to FIGS. 7 and 8, an anode 304, a separator 303, a cathode 302, and a separator 301 are sequentially stacked, laminated, and integrated to form a second electrode element 310. In addition, an anode 312 and a separator 322 are sequentially stacked, laminated, and integrated to form a third electrode element 320. The separator 301 may be removed from the second electrode element 310 to form another second electrode element. In addition, an additional separator may be stacked and laminated to the lower end of the anode 304 of the second electrode element 310 to form another second electrode element.

Referring to FIG. 9, the second electrode element 310 and the third electrode element 320 are sequentially stacked. An A type bicell may be manufactured by stacking another second electrode element, formed by removing the separator 301 from the second electrode element 310, on the third electrode element 320.

Experimental Example 1

Energy density of a stacked and folded type electrode assembly including eight stacked bicells according to an embodiment of the present invention and a conventional stacked and folded type electrode assembly including nine stacked bicells was measured and the results are shown in FIG. 5.

Referring to FIG. 5, it can be seen that the stacked and folded type electrode assembly according to the unlimited embodiment of the present invention has a higher capacity to thickness ratio than the conventional stacked and folded type electrode assembly.

Specifically, the stacked and folded type electrode assembly according to the unlimited embodiment of the present invention has a capacity of 1500 mAh at a thickness of 3.9 mm, whereas the conventional stacked and folded type electrode assembly has a capacity of 1450 mAh at the same thickness. Consequently, it can be seen that the capacity of the stacked and folded type electrode assembly including according to the embodiment of the present invention is about 3% greater than that of the conventional stacked and folded type electrode assembly at the same thickness.

Experimental Example 2

Safety of the stacked and folded type electrode assembly including the eight stacked bicells according to the unlimited embodiment of the present invention was measured and the results are shown in Table 1 below.

TABLE 1

| Item | Specification | Fail/Test |
|---|---|---|
| Overcharge | No fire/No explosion | 0/3 |
| Impact | No fire/No explosion | 0/3 |
| Hot box | No fire/No explosion | 0/3 |
| Side crush | No fire/No explosion | 0/3 |

Experimental Example 3

Needle penetration experiments were carried out for the stacked and folded type electrode assembly including the eight stacked bicells according to the unlimited embodiment of the present invention and the conventional stacked and folded type electrode assembly including the nine stacked bicells and the results are shown in Table 2 below. As can be seen from the experimental results, the stacked and folded type electrode assembly according to the embodiment of the present invention is capable of exhibiting safety having the same level as the conventional stacked and folded type electrode assembly.

TABLE 2

|  | Nail direction | | | | |
|---|---|---|---|---|---|
|  | Single-sided cathode | Double-sided anode | | | |
| Voltage | 4.2 V | 4.2 V | 4.25 V | 4.3 V | 4.35 V |
| Present invention | 0/5 | 0/2 | 0/2 | 0/2 | 0/2 |
| Conventional art | 0/5 | 0/2 | 0/2 | 0/2 | 0/2 |

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a stacked and folded type electrode assembly according to the present invention includes 2n (n being a natural number equal to or greater than 1) polar bodies which are stacked. Consequently, the present invention has an effect in that the stacked and folded type electrode assembly according to the present invention has a higher capacity to thickness ratio than a conventional stacked and folded type electrode assembly including 2n+1 polar bodies.

In addition, in a case in which the outermost electrodes are anodes or single-sided cathodes, it is possible to secure safety having the same level as a conventional stacked and folded type electrode assembly including an odd number of polar bodies.

The invention claimed is:

1. An electrode assembly comprising:
2n bicells which are stacked,
wherein n is a natural number equal to or greater than 1,
wherein the bicells comprise at least one second electrode element comprising at least one cathode, at least one anode and at least one first separator,
wherein outermost electrodes of the bicell have the same polarity,
wherein the at least one second electrode element is configured to have a stacked structure in which the cathode and the anode are stacked so that the at least one first separator is disposed between the cathode and the anode,
wherein the cathode, the anode and the at least one first separator are attached to one another and integrated,
wherein the electrode assembly further comprises a second separator which comprises a separation sheet disposed between the stacked bicells to cover sides of the bicells at which electrode terminals of the bicells are not formed, the second separator being sequentially wound about the bicells from a first end of the second separator to a second end of the second separator, and
wherein one of the outermost electrodes of the electrode assembly is a single-side coated electrode having an electrode mixture layer formed only at one side of a current collector which faces an electrode having an opposite polarity via the at least one first separator, and the other of the outermost electrodes is a double-side coated electrode having electrode mixture layers formed on both sides of a current collector.

2. The electrode assembly according to claim 1, wherein one of the outermost electrodes of the second electrode element is disposed between the first separators.

3. A lithium secondary battery comprising an electrode assembly according to claim 1 provided in a battery case together with an electrolyte.

4. The lithium secondary battery according to claim 3, wherein the battery case is a metal can or a pouch-shaped battery case made of a laminate sheet comprising a metal layer and a resin layer.

5. The lithium secondary battery according to claim 3, wherein the lithium secondary battery is a lithium ion polymer battery, a lithium ion battery, or a lithium polymer battery.

6. A battery module comprising a lithium secondary battery according to claim 3 as a unit cell.

7. A battery pack comprising a battery module according to claim 6 as a power source of a device.

8. The battery pack according to claim 7, wherein the device is an electric vehicle, a hybrid electric vehicle, a plug-in hybrid electric vehicle, or a power storage device.

9. An electrode assembly comprising:
2n−1 second electrode elements which are stacked, wherein n is a natural number equal to or greater than 1; and
a third electrode element,
wherein the second electrode elements and the third electrode element are stacked,
wherein the second electrode elements comprise at least one cathode, at least one anode, and a first separator, and outermost electrodes of the second electrode elements having a same polarity,
wherein the second electrode element is configured to have a stacked structure in which the cathode and the anode are stacked so that the first separator is disposed between the cathode and the anode,
wherein the electrode assembly further comprises a second separator which comprises a separation sheet disposed between the stacked second electrode elements and the third electrode element to cover sides of the second electrode elements and the third electrode element at which electrode terminals of the second electrode elements and the third electrode element are not formed, the second separator being sequentially wound about the second electrode elements and the third electrode element from a first end of the second separator to a second end of the second separator,
wherein the cathode, the anode, and the first separator of the second electrode element are attached to one another and integrated,
wherein one of the outermost electrodes of the electrode assembly is a single-side coated electrode having an electrode mixture layer formed only at one side of a current collector which faces an electrode having an opposite polarity via the first separator, and the other of the outermost electrodes is a double-side coated electrode having electrode mixture layers formed on both sides of a current collector, and
wherein the third electrode element includes any one selected from a cathode and an anode and a first separator, any one selected from between the cathode and the anode and the first separator being attached to each other.

* * * * *